US008181247B1

(12) United States Patent
Pavlyushchik et al.

(10) Patent No.: US 8,181,247 B1
(45) Date of Patent: *May 15, 2012

(54) SYSTEM AND METHOD FOR PROTECTING A COMPUTER SYSTEM FROM THE ACTIVITY OF MALICIOUS OBJECTS

(75) Inventors: Mikhail A. Pavlyushchik, Surrey (CA); Vladislav V. Martynenko, St. Petersburg (RU); Yuri G. Slobodyanuk, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 13/220,056

(22) Filed: Aug. 29, 2011

(51) Int. Cl.
*H04L 29/06* (2006.01)

(52) U.S. Cl. ............................................. 726/22

(58) Field of Classification Search ............. 726/22, 726/23, 24, 25
See application file for complete search history.

(56) References Cited

U.S. PATENT DOCUMENTS

| | | | |
|---|---|---|---|
| 6,401,210 B1 * | 6/2002 | Templeton ................ | 726/24 |
| 6,789,200 B1 * | 9/2004 | Fiveash et al. ............ | 726/1 |
| 6,802,028 B1 * | 10/2004 | Ruff et al. ................. | 714/38.13 |
| 7,114,184 B2 * | 9/2006 | Malivanchuk et al. .... | 726/24 |
| 7,287,279 B2 * | 10/2007 | Bertman et al. ........... | 726/23 |
| 7,376,977 B2 * | 5/2008 | Jindal et al. ............... | 726/30 |
| 7,434,297 B1 * | 10/2008 | Sutton et al. .............. | 26/24 |
| 7,457,951 B1 * | 11/2008 | Proudler et al. ........... | 713/164 |
| 7,467,333 B2 * | 12/2008 | Keeton et al. ............. | 714/41 |
| 7,472,420 B1 * | 12/2008 | Pavlyushchik ............ | 726/24 |
| 7,540,030 B1 | 5/2009 | Zaitsev | |
| 7,712,138 B2 * | 5/2010 | Zobel et al. ............... | 726/25 |
| 7,934,261 B1 * | 4/2011 | Saguiguit et al. ......... | 726/24 |
| 2002/0144129 A1 * | 10/2002 | Malivanchuk et al. .... | 713/188 |
| 2002/0194212 A1 * | 12/2002 | Grupe ...................... | 707/500 |
| 2002/0199116 A1 * | 12/2002 | Hoene et al. .............. | 713/201 |
| 2003/0212906 A1 | 11/2003 | Arnold et al. | |
| 2005/0155031 A1 * | 7/2005 | Wang et al. ............... | 717/170 |
| 2005/0193245 A1 * | 9/2005 | Hayden et al. ............. | 714/13 |

(Continued)

FOREIGN PATENT DOCUMENTS

EP 2207322 A1 7/2010

OTHER PUBLICATIONS

European Search Report cited in corresponding European Patent Application No. EP 11 18 5372.

*Primary Examiner* — David García Cervetti
(74) *Attorney, Agent, or Firm* — Arent Fox LLP; Michael Fainberg

(57) ABSTRACT

Disclosed are systems, methods and computer program products for protecting a computer from activities of malicious objects. The method comprises: monitoring events of execution of one or more processes on the computer; identifying auditable events among the monitored events, including events of creation, alteration or deletion of files, events of alteration of system registry, and events of network access by processes executed on the computer; recording the identified auditable events in separate file, registry and network event logs; performing a malware check of one or more software objects on the computer; if an object is determined to be malicious, identifying from the file, registry and network event logs the events associated with the malicious object; performing rollback of file events associated with the malicious object; performing rollback of registry events associated with the malicious object; terminating network connections associated with the malicious object.

18 Claims, 8 Drawing Sheets

U.S. PATENT DOCUMENTS

| | | | |
|---|---|---|---|
| 2005/0251854 A1* | 11/2005 | Shay | 726/2 |
| 2005/0256957 A1* | 11/2005 | Shay | 709/225 |
| 2005/0257249 A1* | 11/2005 | Shay | 726/3 |
| 2005/0262569 A1* | 11/2005 | Shay | 726/26 |
| 2005/0262570 A1* | 11/2005 | Shay | 726/26 |
| 2005/0268342 A1* | 12/2005 | Shay | 726/26 |
| 2006/0167948 A1* | 7/2006 | Pietravalle | 707/200 |
| 2006/0272021 A1* | 11/2006 | Marinescu et al. | 726/24 |
| 2006/0288419 A1 | 12/2006 | Wang et al. | |
| 2007/0100905 A1 | 5/2007 | Masters et al. | |
| 2008/0095065 A1* | 4/2008 | Albrecht | 370/252 |
| 2009/0077664 A1* | 3/2009 | Hsu et al. | 726/24 |
| 2010/0037324 A1* | 2/2010 | Grant et al. | 726/27 |
| 2010/0281539 A1* | 11/2010 | Burns et al. | 726/23 |
| 2011/0191851 A1* | 8/2011 | Largman et al. | 726/24 |
| 2011/0202995 A1* | 8/2011 | Markham | 726/22 |

* cited by examiner

SYSTEM AND METHOD FOR PROTECTING A COMPUTER SYSTEM FROM THE ACTIVITY OF MALICIOUS OBJECTS

TECHNICAL FIELD

The present disclosure generally relates to the field of computer security, and, specifically, to systems, methods and computer program products for protecting a computer system from the file, registry, system, and network activity of malicious objects.

BACKGROUND

The development of computer technology today has reached very high levels. With the development of computer technology, the quantity of digital data is increasing at even faster-paced rates. At the same time, digital data is vulnerable and need protection from malicious objects such as viruses, Trojan horses, worms, spyware, and other types of malware.

To protect information from malware, antivirus systems are used, the basic task of which is to prevent dangerous activity of malicious objects. But there are situations in which an antivirus system cannot prevent malicious activities in a timely manner. Such situations arise, for example, with the appearance of a new type of malware that cannot be detected by the available means of antivirus systems, since it is unknown to them. Another situation is also possible, in which the malware circumvents the antivirus system, utilizing the vulnerability of the operating system or deficiencies in the antivirus system itself.

Malware that has infiltrated a computer system can exhibit different types of malicious activities: file activity, registry activity, system activity and network activity. During malicious file activity, a malicious object may perform different operations on files, such as the removal, alteration, or creation of new files. Malicious registry activity typically involves the creation, modification, or removal of registry parameters and values. Many cases are well-known, for instance, of registry activity in which a malicious object alters registry parameters so that when the operating system is loaded, the auto-launch of the malware occurs. Malicious system activity may occur when a malware starts or stops processes in a computer system or when it launches new threads of execution in system or program processes. Malicious network activity typically involves the creation of new network connections by a malicious object.

Using these malicious activities, the malware can infiltrate a computer system and gain access to data stored thereon. Therefore, there is a need for detecting malicious activity and restoring data that was damaged, modified or removed as a result of malicious activities.

SUMMARY

Disclosed are systems, methods and computer program products for protecting a computer from the file, registry, system, and network activity of malicious objects. In one example embodiment, the system includes an antivirus database containing information about known malicious objects, and an auditable event database containing a list of auditable events including at least events of creation, alteration or deletion of files, events of creation, alteration or deletion of system registry, and events of network access by processes executed on the computer. The system also includes a data collection module operable to monitor events of execution of one or more processes on the computer; identify auditable events among the monitored events based on the list of auditable events contained in the auditable event data store; and record the identified auditable events in separate file, registry and network event logs contained in the memory.

The system also includes an antivirus module configured to: perform a malware check of one or more software objects on the computer using the information about known malicious objects contained in the antivirus database. If an object is determined to be malicious, the antivirus module identifies from the network event log one or more of network events associated with said malicious object and terminates one or more network connections established by said malicious object. The system also includes a recovery module configured to, if the object is determined to be malicious, identify from the file and registry event logs one or more file and registry events associated with said malicious object and perform rollback of file events and registry events associated with the malicious object.

In one example embodiment a method for protecting computer from malware comprises: monitoring events of execution of one or more processes on the computer; identifying auditable events among the monitored events, including events of creation, alteration or deletion of files, events of creation, alteration or deletion of system registry, and events of network access by processes executed on the computer; recording the identified auditable events in separate file, registry and network event logs; performing a malware check of one or more software objects on the computer; if an object is determined to be malicious, identifying from the file, registry and network event logs the events associated with the malicious object; performing rollback of file events associated with the malicious object; performing rollback of registry events associated with the malicious object; terminating network connections associated with the malicious object.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description serve to explain their principles and implementations.

In the drawings.

DETAILED DESCRIPTION OF EXAMPLE EMBODIMENTS

Example embodiments of the present invention are described herein in the context of systems, methods and computer program products for protection of computers from malware. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments of the invention as illustrated in the accompanying drawings. The same reference indicators will be used to the extent possible throughout the drawings and the following description to refer to the same or like items.

Figure 1:
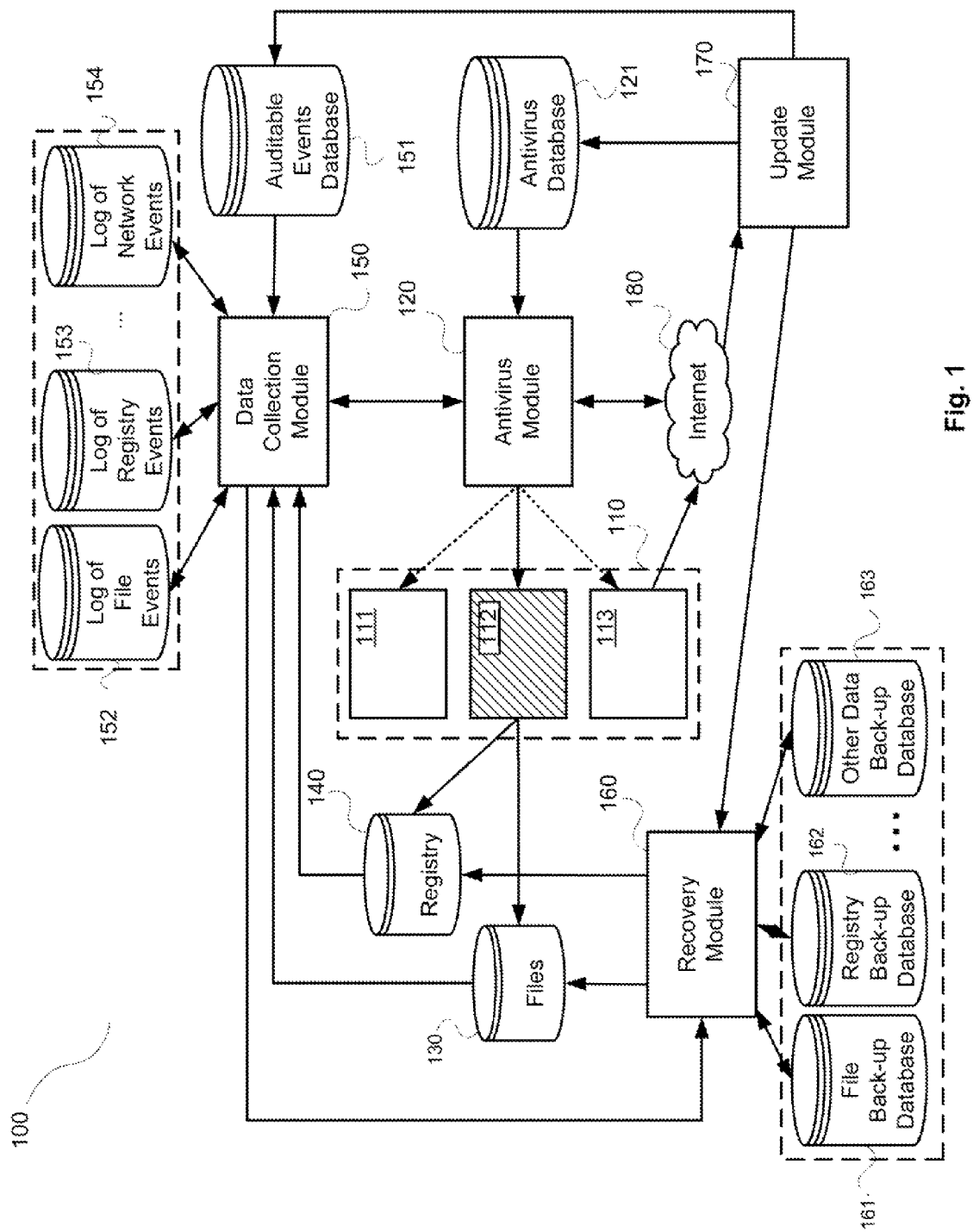
FIG. 1 illustrates a schematic diagram of a malware protection system according to one example embodiment.

FIG. 1 illustrates a schematic diagram of a malware protection system 100 according to one example embodiment. The system 100 may be implemented as a software application that can be deployed on a personal computer or network server, which is described in greater detail in FIG. 5 below. In one example embodiment, the system 100 comprises an antivirus module 120 that performs antivirus check of software objects 110, including objects 111, 112 and 113, such as system and program files, scripts and other executable codes running on a personal computer or server on which system 100 is deployed. Of the software objects 110, object 112 is malicious. In one example embodiment, antivirus module 120 can be a program module, which uses drivers to interact with the core of the operating system of computer on which system 100 is deployed. The antivirus module 120 may use various malware detection techniques, such as signature check or heuristic and behavioral analysis or other methods for analysis of objects 110.

A signature check is based on a comparison of the byte code of the analyzed objects 110 with the codes of various malicious objects stored in malware signatures. Heuristic analysis, in searching for malicious objects, uses an analytical engine that applies flexibly set patterns, for example patterns described using fuzzy logic. A behavioral analysis in a particular case is based on the observation of system events. Determination of a malicious object is based on its behavior in the system within the framework of set rules for malware behavior.

During antivirus check of objects 110, antivirus module 120 may also check processes and threads launched during the execution of these objects. Antivirus module 120 may use malware signatures and behavior signatures contained in antivirus database 121 during analysis of objects 110 and related processes and threads. The signatures of malware objects are sequences of bytes which are compared with the program code of the object being checked. In one example, signatures can be considered in the form of checksums, which are created for each malicious object and stored in the antivirus database 121. In such a case, antivirus module 120 can compare checksum of the object being analyzed with signatures of known malicious objects. If there is a match between the two, this means that the object being analyzed is malicious.

Behavior signatures, in turn, contain information on possible actions of potentially malicious objects, such as initiating system functions, referencing register data, etc. Antivirus module 120 may monitor behavior of objects 110 and related processes and threads; if the behavior of the object is similar to the behavior signatures of known malicious objects from antivirus database 121, then the monitored object 112 will be recognized as malicious.

In one example embodiment, if antivirus module 120 detects a malicious object 112, it transfers identification information about the malicious object to a data collection module 150. The identification information may contain a path to the malicious object 112, the name of the object or, for instance, the checksum of the malware. In addition, antivirus module 120 may request the data collection module 150 to provide to the antivirus module 120 information about certain system activities associated with execution of the identified malicious object 112 in order to detect any related malicious processes and threads associated with the malicious object.

In another example embodiment, antivirus module 120 may also send information about the detected malware to a remote, central antivirus server (not depicted) via the Internet 180. The antivirus server may in turn distribute information about detected malicious object to other malware protection systems, which have access to the antivirus server. This exchange of malware information between malware protection systems 100 deployed on various computers in a network through the central antivirus server may impede spread of new types of malware.

When antivirus module 120 detects dangerous system activity, such as the launch of a dangerous process by the object 112 or the launch of a dangerous thread of execution in another process by the object 112, antivirus module 120 is configured to terminate the dangerous activity. In particular, antivirus module 120 terminates the execution of dangerous process or thread of execution and transfers identification information about the malicious object 112 that initiated this process or thread of execution to the data collection module 150.

In one example embodiment, data collection module 150 is configured to monitor the activity of execution of various objects 110 and to gather the history of object activities in logs of file or registry or other events 152-154. For example, in the course of execution of objects 110, such as objects 111, 112 and 113, these objects may initiate processes that effect file modification (file activity), registry alterations (registry activity), and/or creation of network connections (network activity). The data collection module 150 is configured to record history of this activity. In one example embodiment, the data collection module 150 may refer to the database of auditable events 151 to obtain a list of events that should be monitored. The auditable events list 151 include, but are not limited to, events of file creation, modification and deletion, registry alterations, process or thread spawning, creation of network connections, and other events that may be characteristic of malicious activity. In addition, to collection of events data, data collection module 150 may also identify parent-child relationships between different objects by keeping track of which files were installed by which process and when, and which process was spawned by which process and when (i.e., the parent-child relationships).

In one of the embodiments, the data collection module 150 may monitor all system events identified in the auditable events database 151 and/or events associated with specific objects. To that end, the data collection module 150 may contain a list of indicators, such as system addresses, of software objects 110 being monitored by the malware protection system 100. For the monitored objects, the data collection module 150 may record the events of file creation, removal, or change, as well as the creation, removal, or alteration of registry values, and other events indicated in the auditable events database 151 to the logs of events 152-154.

For example, if some object in the computer system, whose maliciousness has not been established by the antivirus module 120, creates a file in a system folder of the operating system, then this event may be recorded by data collection module 150, and it will be known what file was created by what object. Later, upon antivirus checking, if it is discovered that this file was created by a malicious object, then this file may be removed by a recovery module 160, as will be described in greater detail below.

In one example embodiment, data collection module 100 may also maintain separate logs for different types of auditable events, such as a log of file events 152 and a log of registry events 153, which are used to store information about file and registry activity of monitored objects. In other embodiments, the system 100 can also maintain logs of other events 154, such as user activity events, data input-output events, network activity events, etc. In this manner, system 100 may collect history of system, file, registry and network activity of various objects.

In one example embodiment, the file events log 152 may contain the identifiers of objects performing file activity (e.g., file name, process or thread identifier), the type of file activity (e.g., creation of a new file, alteration of a file, the removal of a file) and identifiers of the files on which operations were performed. The file identifiers may be implemented as, for example, as the file path, the file checksum, or the file-path checksum.

In one example embodiment, the registry events log 153 may contain the identifiers of objects performing registry activity, the type of registry activity (e.g., creation of a new register parameter, a change in a registry parameter value, the removal of a registry parameter or value) and the name of the registry parameter on which the operations were performed.

In one example embodiment, the network events log 154 may contain the identifiers of objects performing network activity (e.g., file name, process or thread identifier), the type of network activity (e.g., creation of new network connections, port numbers or types of network connections, such as TCP, UDP or FTP, etc.) and the type of data transferred/received via the established connections (e.g., identifiers of files received/transferred). The file identifiers may be implemented, for example, as the file path, the file checksum, or the file-path checksum.

In one example embodiment, auditable events database 151 and antivirus database 121 may be periodically updated. The antivirus database 121 may be periodically updated with the appearance of new types of threats, in order for the antivirus module 120 to reliably execute in a timely manner the detection of malicious objects and other threats. The list of auditable events stored in the database 151 should also be updated periodically, in order to assure that new types of malicious activities are monitored by the malware protection system. Updating the databases 121 and 151 may be done by means of an update module 170, which, using connection to the Internet 180, may download the latest versions of the antivirus definitions and auditable events from the central antivirus server. The update module 170 may be implemented as a software module on the basis of a network adapter which provides a network connection.

In one example embodiment, when, during a routine malware check, the antivirus module 120 detects a malicious object 112, module 120 communicates information about the malicious object 112 to the data collection module 150. The module 150 extracts from the file event log 152, registry events log 153, and network events log 154 information about file, registry, and network activity of the malicious object 112. In addition, the module 150 identifies all file, registry and network activity associated with all parent and children processes and threads of execution spawned by object 112. Then, module 150 sends this information to the recovery module 160. Based on the received information, the recovery module 160 determines which files or registry parameters need to be removed, if new files or registry parameters were created, and which files or registry parameters to restore, if they have been altered or removed.

In one example embodiment, recovery module 160, having received data using the data collection module 150, performs rollback of file and registry events associated with malicious objects. For example, the recovery module 160 may delete all new non-system files and registry parameters created by the malicious object 112. If any files or registry values have been altered, or any files, registry values or parameters have been removed, the recovery of the original files, registry values and parameters is performed. For the original files and registry data, the recovery module 160 may refer to the file back-up database 161 and registry back-up database 162. In other embodiments, the system 100 may also include other data back-up databases 163 for other types of data, such as user data.

In one example embodiment, the file back-up database 161 may contain copies of files 130 that are of special significance to operation of the computer system on which system 100 is deployed. Such files may include system files, such as ntoskrnl.exe, ntdetect.com, hal.dll, boot.ini and other files in the operating systems of the Microsoft® Windows® NT family. In addition, file back-up database 161 can also store other files, the integrity of which is important for the computer system or the system user. The registry back-up database 162 may contain a copy of registry data 140 affecting the performance of the operating system.

In order to recover files 130 and the registry data 140 of the computer system, the recovery module 160 processes the data received from the data collection module 150 and receives information about altered or removed files or registry parameters. After this, the recovery module 160 searches for the corresponding files and registry parameters in the back-up databases 161 and 162. If such files and registry data are found, then the recovery module 160 restores the files and registry data which were altered or removed by the malicious object.

In a particular embodiment, the recovery module 160 may restore only modified portions of the altered file and not the entire file. In such a case, the back-up file database 161 will also contain portions of files, which are most likely to be subjected to malicious actions.

In one example embodiment, the back-up databases 161-163 may be filled in with files and registry information by the user or from remote central antivirus database via update module 170. In the latter case, the update module 170 initiates the fill of the back-up databases 161-163 with new files and register values, a list of which was received by the update module 170 over the Internet 180 from the central antivirus server or other reliable data source. After this, the update module 170 may start the update process, and the recovery module 160 fills the back-up copies of files, registry and other data in back-up database 161-163, respectively.

Figure 2:
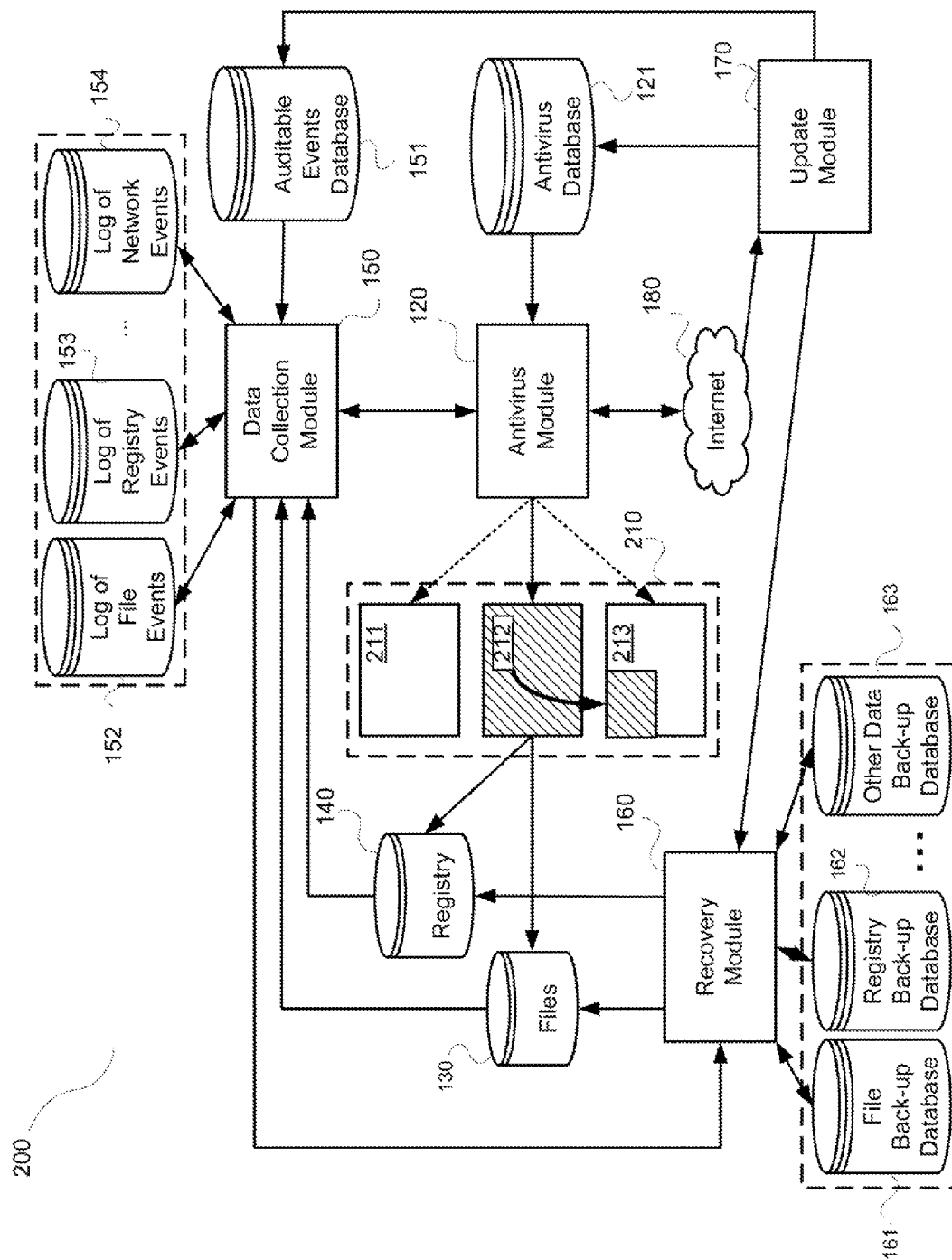
FIG. 2 illustrates a schematic diagram of operation of the malware protection system according to another example embodiment.

FIG. 2 illustrates schematic diagram of operation of the malware protection system according to one example embodiment. File activity of a malicious object can consist of not just the creation and removal of files, in which case a file will be accordingly removed or restored by the recovery module 160. Other actions of a malicious object are also possible, for example altering a file. In FIG. 2, malicious object 212 alters the object 213, which was harmless up until the alteration. The alteration may consist, for example, of the introduction of malicious code into the original file 213. After the changes made in the object 213, the object 212 ceases to perform any activity. On the other hand, object 213 begins to perform activity associated, for example, with the removal of the files 130 or the registry values 140. At the same time, the actions associated with the activity of object 213 may be recorded by the data collection module 150.

If, in the course of antivirus check, the antivirus module 120 determines that object 213 presents a threat, that is, it is malicious; module 120 may block activity of the object 213 and transfer information about this object to the data collection module 150 and to the antivirus server (not depicted). The data collection module 150 transfers information about activity history to the recovery module 160, which restores the altered data using the back-up databases 161-163. At the same time, it also restores object 213, if its copy was in the file back-up database 161.

In addition, the antivirus module 120 may request the data collection module 150 to provide information about activity associated with object 213. In response, the data collection module 150 may provide to the antivirus module 120 information that object 213 was altered by object 212. The antivirus module 120 may then conduct antivirus check of object 212, determine that it is malicious and block it, thus preventing further malicious actions of this object.

Figure 3:
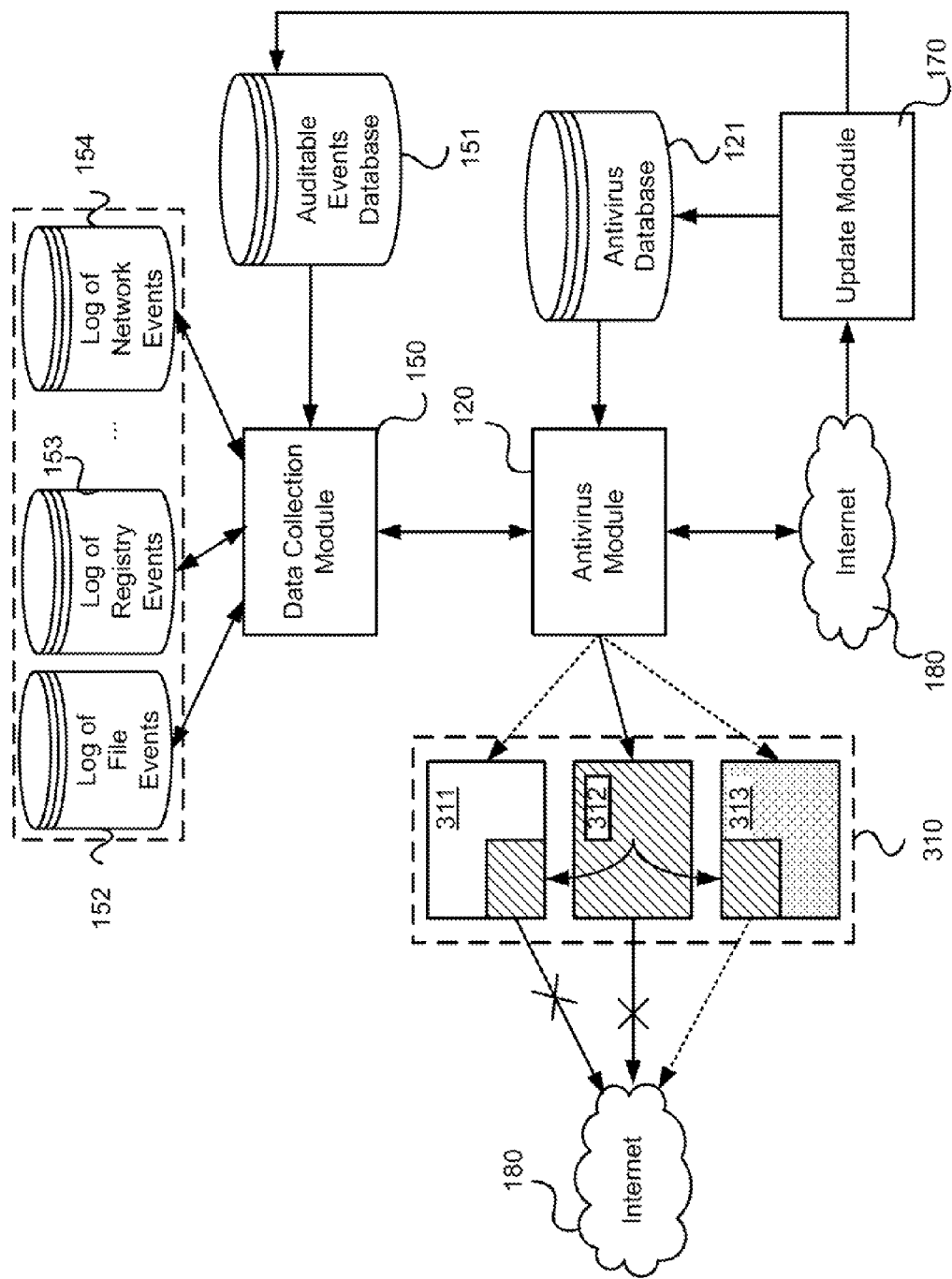
FIG. 3 illustrates a schematic diagram of operation of the malware protection system according to another example embodiment.

FIG. 3 illustrates schematic diagram of operation of the malware protection system according to another example embodiment. Certain objects 310 in the course of their execution may create new network connections, for example, a connection to the Internet 180. If a network connection was created by a malicious object, it may present a threat to the computer, since it increases the computer's vulnerability. A malicious object can transfer data from the computer or download other dangerous objects to the computer from the Internet. To prevent such situations, the network activity of objects may be monitored by data collection module 150 and recorded in the log of network events 154 according to one example embodiment.

More specifically, if antivirus module 120 detects a malicious object, the antivirus module 120 may request from data collection module 150 information about network activity of the malicious object or any related objects, process or threads of said malicious object. In the example above, the object 312 is a malicious object exhibiting network activity, which was recorded in the log of network events 154 by the data collection module 150. The antivirus module 120, after determining that object 312 is malicious and identifying network events associated with object 312 may terminate/block all network connections established by malicious object 312, terminate execution of malicious object 312, and transfer information about object 312 to the data collection module 150 in order to later restore file and registry data, if malicious file or registry activity has been observed for this object or any related objects.

A situation is also possible in which the malicious object 312 spawns process or a thread of execution in a safe object or process 311 of the computer, which then creates a network connection which was recorded in the log of network events 154. With the occurrence of such a situation, two cases may be distinguished: when the malicious object 312 introduces itself into a safe object 311 or safe process without affecting system performance, or when malicious object 312 introduces itself in the object 313, which represents a system file or system process.

In the first case, when the infected object or process is not a system process, then the antivirus module 120 records the fact of the infection and of the next network activity and blocks the modified object 311. In blocking the object, its following activities are stopped:

file activity: the object cannot perform file operations;
registry activity: the possibility is blocked for access to the system registry;
system activity: all processes and flows launched by the object are terminated;
network activity: the possibility of creating network connections is blocked.

If antivirus module 120 detects that a thread of execution was spawned by malicious object 312 in process 311, the thread is terminated and all network connections associated with the process 311 may also be automatically terminated by the antivirus module 120.

In the case of a modified system file or process 313, the antivirus module 120 generally cannot block system object 313 because this can lead to an operating system failure. Nevertheless, antivirus module 120, upon detecting the network activity of the modified system file 313 may stop the network activity and terminate the network connection initiated by only the introduced portion of the code, with the object 313 remaining operational. The system object 313 may then be restored using its back-up copy in file back-up database 161.

If a malicious thread of execution was spawned by object 312 in the system object 313, then the execution of the malicious thread may be terminated without effect on object 313.

Figure 4A:
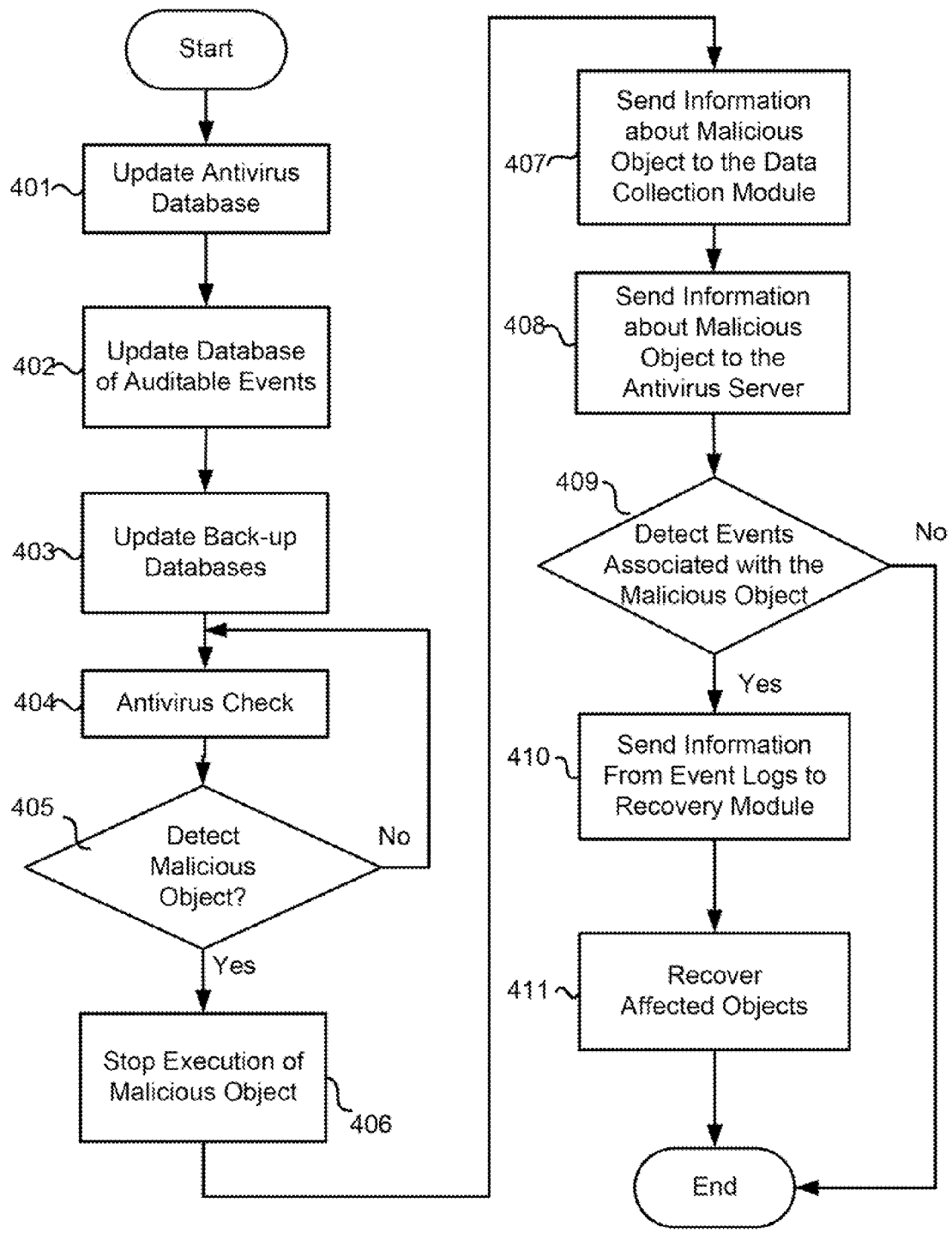
FIGS. 4A-4E illustrate algorithms of operation of the malware protection system according to various example embodiments.

FIG. 4A illustrates an algorithm of operation of the malware protection system according to one example embodiment. At steps 401-403, antivirus database 121, database of auditable events 151 and back-up databases 161-163 may be updated using the update module 170. Next, at step 404, the antivirus module 120 performs antivirus check of objects 110 in the computer system. If at step 405 it is found that the objects being checked or the process initiated by these objects are not malicious, then the processes at step 405 may be repeated at a later time. However, if any of the objects 110 or the corresponding processes are malicious, then, at step 406, the execution of the malicious object is stopped. Furthermore, the information identifying this object is transferred to the data collection module 150 at step 407, and to the antivirus server at step 408. Also, information can be received from the antivirus server about the activity of the detected object in the computers of other users. This information can also be used by the antivirus module 120. In the next step 409, a check is performed for the presence of activity of this object. In particular, a data search is performed in the file events log 152, registry events log 153 and other available event logs 154 for activity of the malicious object or any related processes, threads, etc. If records of malicious file or registry activity of the malicious object are found, then the data concerning the activities performed by the object are transferred to the recovery module 160 at step 410. At step 411, the recovery module 160 uses this data to restore file and registry data using file and registry back-up data from databases 161 and 162.

Figure 4C:
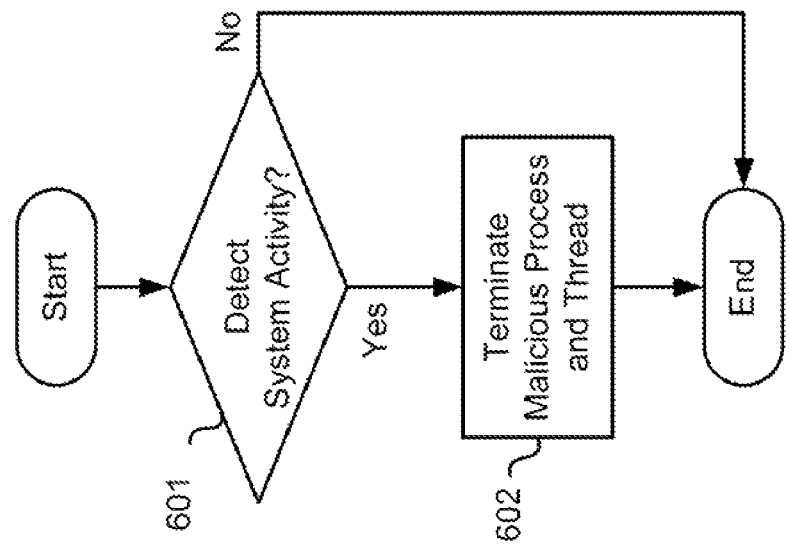
Figure 4B:
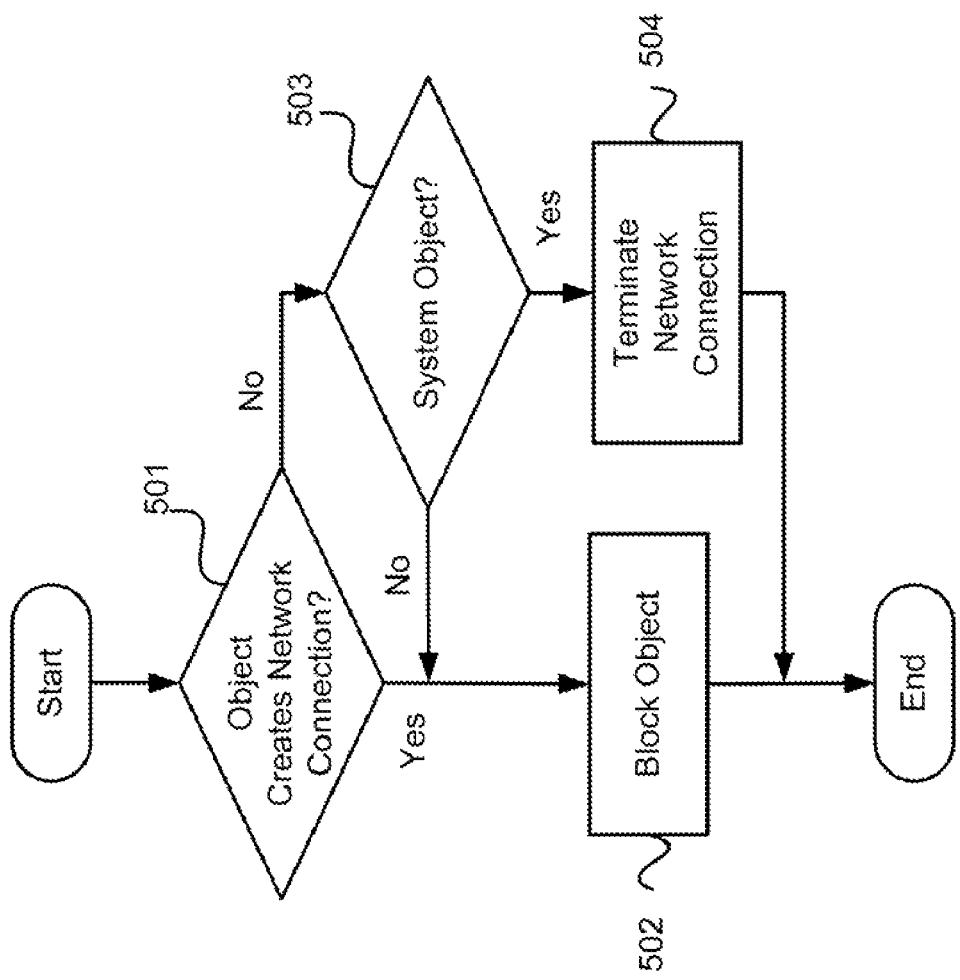

FIG. 4B illustrates one example embodiment of an algorithm of operation of the malware protection system in response to malicious network activity. At step 501, antivirus module 120 checks if a detected malicious object 312 or processes associated therewith have requested or opened any network connections. This information can be obtained using the data collection module 150. A network connection created directly by the malicious object 312 itself will be automatically terminated after the blocking of the object by the antivirus module 120 at step 502. If information from the data collection module 150 also indicates that this malicious object has made a modification to other objects 311, 312 in which network activity has also been observed, the antivirus module 120 checks at step 503 whether the modified objects are system objects. If a modified object 311 is not a system object, then antivirus module 120 blocks this object at step 502, and the network connection is terminated automatically. In the event of the alteration of a system object 313, there is no possibility of blocking the object, since this may lead to an operating system failure. However, the antivirus module 120 may terminate the network connection in step 504 which was initiated by the introduced portion of the modified system object 313. The object itself remains operational. Afterward, this system object can be restored using the recovery module 160. In the case of the launch of a malicious thread in a system process, this malicious thread of execution may also stopped.

FIG. 4C illustrates one example embodiment of an algorithm of operation of the malware protection system in response to malicious system activity. System activity includes the presence of processes launched by a malicious object, as well as the launch of threads of execution in other processes. If, at step 601, antivirus module 120 identifies system activity of a malicious object, by for example requesting this information using data collection module 150, antivirus module 120 may then terminates all processes and threads associated with that object at step 602. In addition, information about the terminated processes may be forwarded to the recovery module 160, which determines if any affected files or registry data needs updating.

Figure 4D:
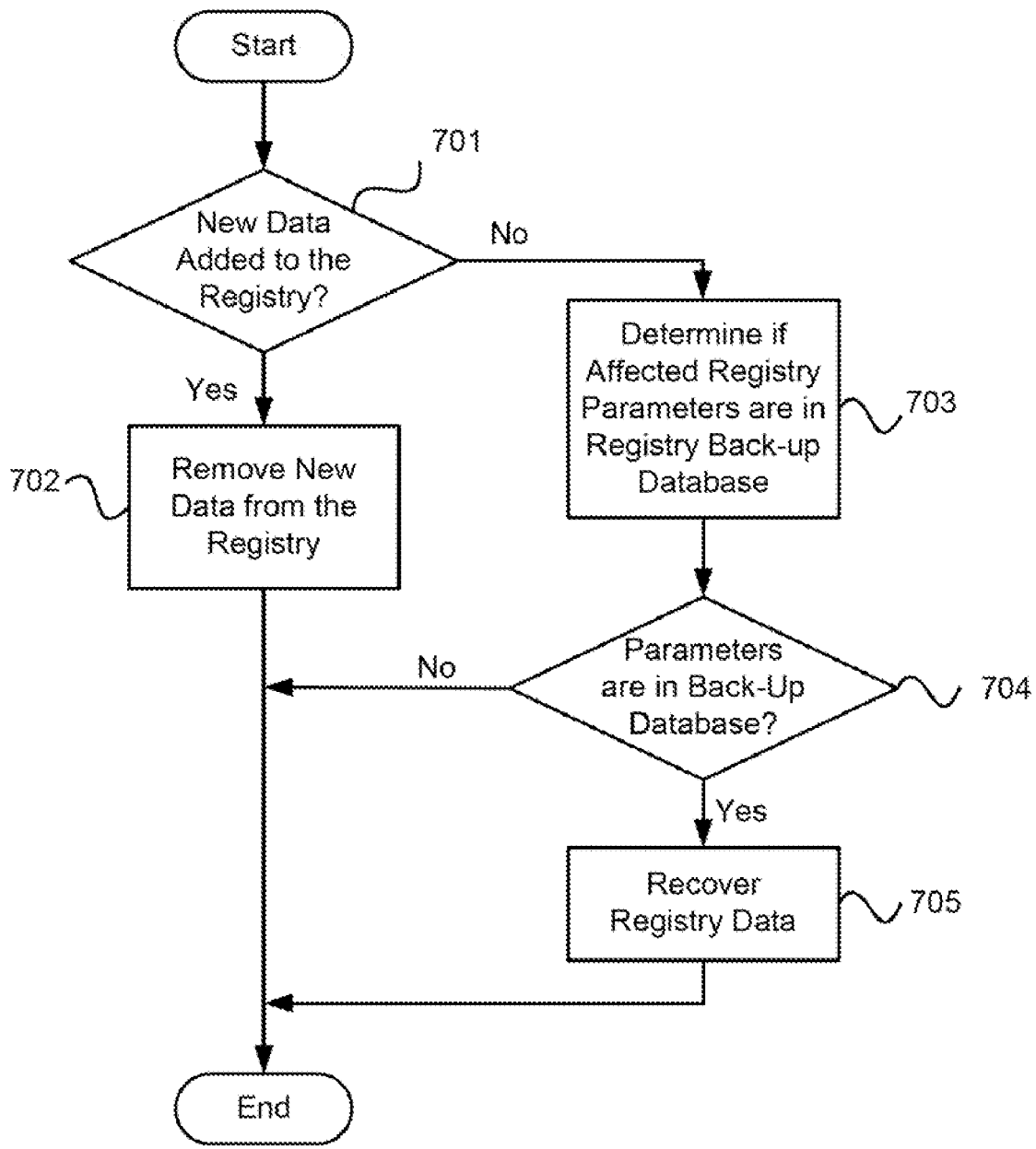

FIG. 4D illustrates one example embodiment of an algorithm of operation of the malware protection system in response to malicious registry activity. At step 701, antivirus module 120 determines using the data collection module 150 if registry 140 was affected, e.g., new registry entries were made, by the actions of a malicious object. If such activity was detected, the recovery module 160 may be instructed to remove the new data from the registry at step 702. If values of registry parameters were altered or removed, or if a registry parameter was removed, the recovery module 160 checks at step 703 if affected registry value and parameter are in back-up registry database 162. If back-up data is found, recovery module 160 restores the altered or removed registry value or parameter at step 705 with back-up copies.

Figure 4E:
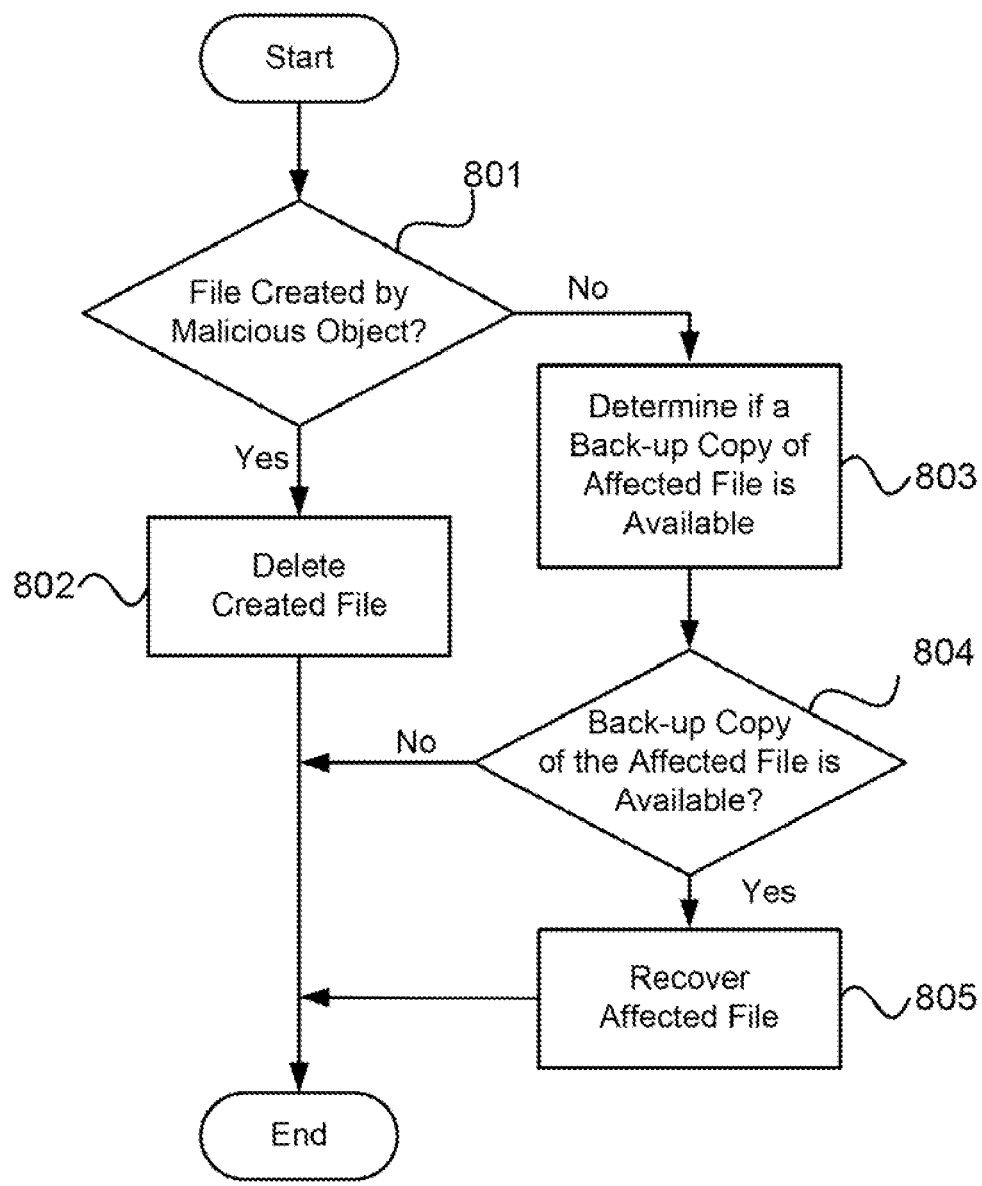

FIG. 4E illustrates one example embodiment of an algorithm of operation of the malware protection system in response to malicious file activity. At step 801, antivirus module 120 requests using the data collection module 150 information about all new files that were created by the malicious object. If a new file was created, then recovery module 160 is instructed to remove this file at step 802. If a new file was not created, but an existing file was altered or removed by the malicious object, then at step 803, the recovery module 160 determines if a back-up copy of the affected file is available in database 161. If the necessary file is found at step 804, recovery module 160 restores the affected file at step 805.

Figure 5:
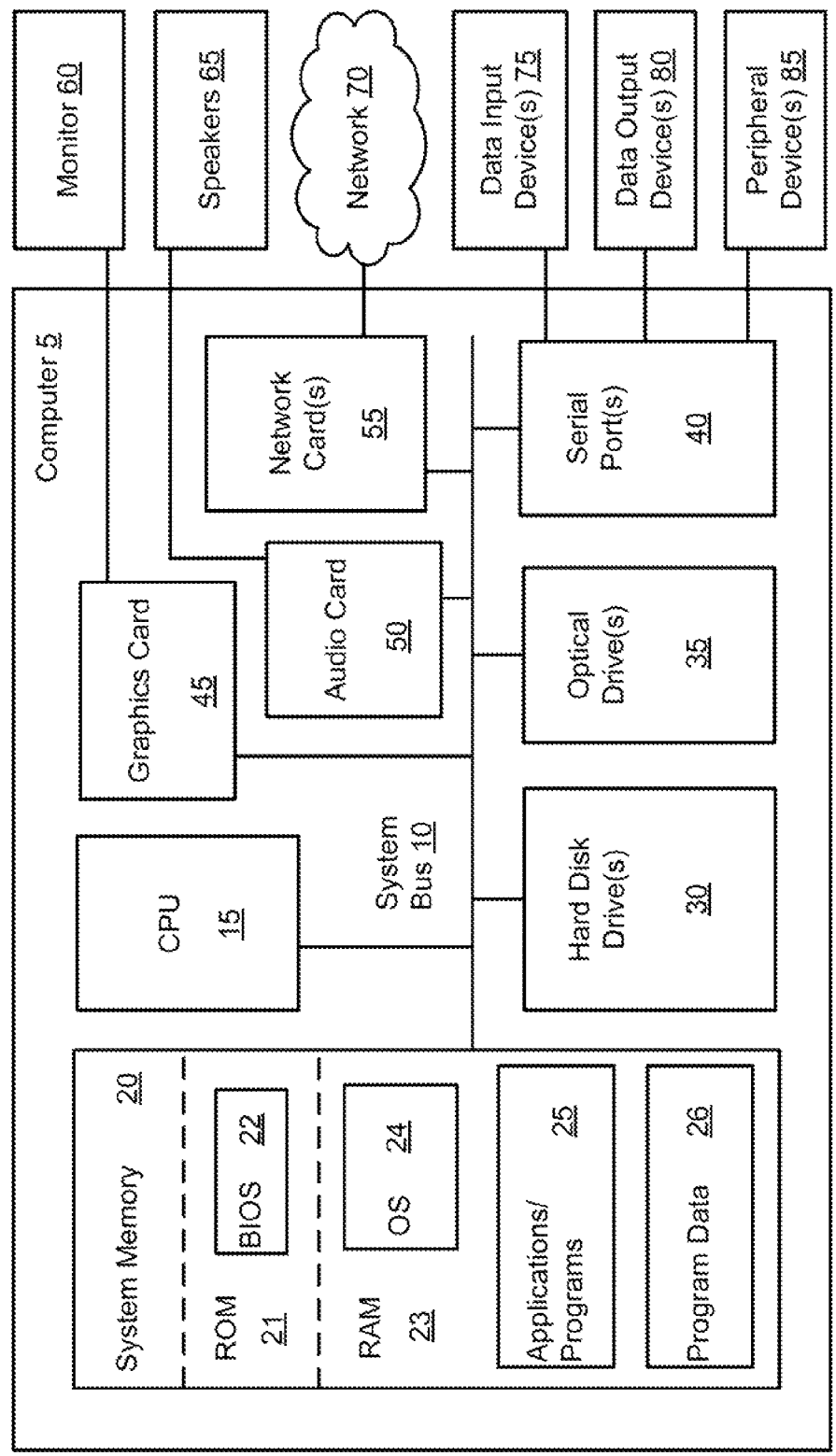
FIG. 5 illustrates a schematic diagram of a computer system according to one example embodiment.

FIG. 5 depicts an example embodiment of a computer system 5 on which malware protection system 100 may be deployed. The computer system 5 may include a network server, a personal computer, a notebook, a tablet, a smart phone, a media receiver or other types of data processing and computing devices. Computer 5 may include one or more processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. System memory 20 also stores applications and programs 25, such as services 306. System memory 20 also stores various runtime data 26 used by programs 25.

Computer system 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various embodiments, the algorithms and methods described herein may be implemented in hardware, software, firmware, or any combination thereof. If implemented in software, the functions may be stored as one or more instructions or code on a non-transitory computer-readable medium. Computer-readable medium includes both computer storage and communication medium that facilitates transfer of a computer program from one place to another. A storage medium may be any available media that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave are included in the definition of medium.

In the interest of clarity, not all of the routine features of the embodiments are shown and described herein. It will be appreciated that in the development of any such actual implementation, numerous implementation-specific decisions must be made in order to achieve the developer's specific goals, and that these specific goals will vary from one implementation to another and from one developer to another. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

What is claimed is:

1. A computer-implemented method for malware protection of a computer, the method comprising:
    monitoring events of execution of one or more processes on the computer;
    identifying auditable events among the monitored events, wherein the auditable events include at least events of creation, alteration or deletion of files, events of creation, alteration or deletion of parameters or values of system registry, and network connection events by one or more software objects on the computer;
    recording the identified auditable events in separate file, registry and network event logs;
    performing a malware check of one or more software objects on the computer;
    if an object is determined to be malicious,
        identifying from the file and registry event logs one or more file events and registry events associated with said malicious object;
        performing rollback of one or more identified file events and registry events;
        identifying from the network log one or more network connections associated with parent processes, children processes or threads of execution of said malicious object; and
        terminating one or more of the identified network connections.

2. The method of claim 1, wherein performing rollback of file events comprises:
    based on the identified file events associated with the malicious object, identifying one or more files created, altered or deleted by the malicious object;
    deleting the identified new files created by the malicious object; and
    restoring at least portions of the altered and deleted files from a trusted backup.

3. The method of claim 1, wherein performing rollback of registry events comprises:
    based on the identified registry events associated with the malicious object, identifying one or more registry parameters and values created, altered or deleted by the malicious object;
    deleting new registry parameters and values created by the malicious object; and
    restoring altered or deleted registry parameters and values from a trusted backup.

4. The method of claim 1, wherein monitoring events of execution of one or more processes on the computer further comprises:
    identifying relationships between monitored parent and children processes and threads of execution spawned by said monitored processes; and
    identifying from the file, registry and network event logs one or more of file, registry and network events associated with one or more related parent and children processes and threads of execution spawned by said malicious object.

5. The method of claim 4 further comprising:
    identifying one or more system and non-system files created, altered or deleted by the parent and children processes and threads of execution spawned by said malicious object;
    restoring at least portions of the altered system and non-system files or deleted system and non-system files from a trusted backup;
    deleting all identified new non-system files created by the parent and children processes and threads of execution spawned by said malicious object.

6. The method of claim 4 further comprising:
    identifying one or more registry parameters and values created, altered or deleted by the parent and children processes and threads of execution spawned by said malicious object;
    deleting one or more identified new registry parameters and values created by the parent and children processes and threads of execution spawned by said malicious object; and
    restoring altered or deleted registry parameters and values from a trusted backup.

7. A computer-based system for malware protection of a computer having a processor and a memory, the system comprising at least the following software modules loaded into the memory of the computer and executable by the processor of the computer:
    an antivirus database containing information about known malicious objects;
    an auditable event database containing a list of auditable events including at least events of creation, alteration or deletion of files, events of creation, alteration or deletion of parameters or values of system registry, and network connection events by one or more software objects on the computer;
    a data collection module configured to:
        monitor events of execution of one or more processes on the computer;
        identify auditable events among the monitored events based on the list of auditable events contained in the auditable event database; and
        record the identified auditable events in separate file, registry and network logs contained in the memory;
    an antivirus module configured to:

perform a malware check of one or more software objects on the computer using the information about known malicious objects contained in the antivirus database;

if an object is determined to be malicious,
identify from the network log one or more of network connections associated with parent processes, children processes or threads of execution of said malicious object; and
terminate one or more of the identified network connections;

a recovery module configured to:
if the object is determined to be malicious,
identify from the file and registry event logs one or more file events and registry events associated with said malicious object; and
perform rollback of one or more identified file events and registry events.

8. The system of claim 7, wherein to perform rollback of file events, the recover module further configured to:
based on the identified file events associated with the malicious object, identify one or more files created, altered or deleted by the malicious object;
delete the identified new files created by the malicious object; and
restore at least portions of the altered and deleted files from a trusted backup.

9. The system of claim 7, wherein to perform rollback of registry events, the recover module further configured to:
based on the identified registry events associated with the malicious object, identify one or more registry parameters and values created, altered or deleted by the malicious object;
delete new registry parameters and values created by the malicious object; and
restore altered or deleted registry parameters and values from a trusted backup.

10. The system of claim 7, wherein to monitor events of execution of one or more processes, the data collection module further configured to:
identify relationships between monitored parent and children processes and threads of execution spawned by said monitored processes; and
identify from the file, registry and network event logs one or more of file, registry and network events associated with one or more related parent and children processes and threads of execution spawned by said malicious object.

11. The system of claim 10, wherein the recovery module is further configured to:
identify one or more system and non-system files created, altered or deleted by the parent and children processes and threads of execution spawned by said malicious object;
restore at least portions of the altered system and non-system files or deleted system and non-system files from a trusted backup; and
delete all identified new non-system files created by the parent and children processes and threads of execution spawned by said malicious object.

12. The system of claim 10, wherein the recovery module is further configured to:
identify one or more registry parameters and values created, altered or deleted by the parent and children processes and threads of execution spawned by said malicious object;

delete one or more identified new registry parameters and values created by the parent and children processes and threads of execution spawned by said malicious object; and
restore altered or deleted registry parameters and values from a trusted backup.

13. A computer program product embedded in a non-transitory computer-readable storage medium, the computer-readable storage medium comprising computer-executable instructions for malware protection of a computer, the instructions for:
monitoring events of execution of one or more processes on the computer;
identifying auditable events among the monitored events, wherein the auditable events include at least events of creation, alteration or deletion of files, events of creation, alteration or deletion of parameters or values of system registry, and network connection events by one or more software objects on the computer;
recording the identified auditable events in separate file, registry and network event logs;
performing a malware check of one or more software objects on the computer;
if an object is determined to be malicious,
identifying from the file and registry event logs one or more file events and registry events associated with said malicious object;
performing rollback of one or more identified file events and registry events;
identifying from the network log one or more network connections associated with parent processes, children processes or threads of execution of said malicious object; and
terminating one or more of the identified network connections.

14. The computer program product of claim 13, wherein instructions for performing rollback of file events comprise instructions for:
based on the identified file events associated with the malicious object, identifying one or more files created, altered or deleted by the malicious object;
deleting the identified new files created by the malicious object; and
restoring at least portions of the altered and deleted files from a trusted backup.

15. The computer program product of claim 13, wherein instructions for performing rollback of registry events comprise instructions for:
based on the identified registry events associated with the malicious object, identifying one or more registry parameters and values created, altered or deleted by the malicious object;
deleting new registry parameters and values created by the malicious object; and
restoring altered or deleted registry parameters and values from a trusted backup.

16. The computer program product of claim 13, wherein instructions for monitoring events of execution of one or more processes on the computer further comprise instructions for:
identifying relationships between monitored parent and children processes and threads of execution spawned by said monitored processes;
identifying from the file, registry and network event logs one or more of file, registry and network events associated with one or more related parent and children processes and threads of execution spawned by said malicious object.

17. The computer program product of claim 16 further comprising instructions for:
  identifying one or more system and non-system files created, altered or deleted by the parent and children processes and threads of execution spawned by said malicious object;
  restoring at least portions of the altered system and non-system files or deleted system and non-system files from a trusted backup;
  deleting all identified new non-system files created by the parent and children processes and threads of execution spawned by said malicious object.

18. The computer program product of claim 16 further comprising instructions for:
  identifying one or more registry parameters and values created, altered or deleted by the parent and children processes and threads of execution spawned by said malicious object;
  deleting one or more identified new registry parameters and values created by the parent and children processes and threads of execution spawned by said malicious object; and
  restoring altered or deleted registry parameters and values from a trusted backup.

* * * * *